United States Patent
Wehner (10) Patent No.: US 9,572,464 B2
(45) Date of Patent: Feb. 21, 2017

(54) ROOM-CLEANING SYSTEM WITH WATER CONTAINER

(71) Applicant: PRO-AQUA International GmbH, Ansbach (DE)

(72) Inventor: Jürgen Wehner, Ansbach (DE)

(73) Assignee: PRO-AQUA International GmbH, Ansbach (DE)

( * ) Notice: Subject to any disclaimer, the term of this patent is extended or adjusted under 35 U.S.C. 154(b) by 0 days.

(21) Appl. No.: 14/385,462

(22) PCT Filed: Feb. 26, 2013

(86) PCT No.: PCT/EP2013/053836
§ 371 (c)(1),
(2) Date: Sep. 15, 2014

(87) PCT Pub. No.: WO2013/135482
PCT Pub. Date: Sep. 19, 2013

(65) Prior Publication Data
US 2015/0067979 A1    Mar. 12, 2015

(30) Foreign Application Priority Data

Mar. 15, 2012   (DE) ........................ 10 2012 102 180

(51) Int. Cl.
*A47L 5/36*       (2006.01)
*A47L 7/00*       (2006.01)

(52) U.S. Cl.
CPC .............. *A47L 5/365* (2013.01); *A47L 7/0019* (2013.01); *A47L 7/0023* (2013.01)

(58) Field of Classification Search
CPC ........ A47L 5/365; A47L 7/004; A47L 7/0019; A47L 7/0023; A47L 7/0042; A47L 9/009; A47L 9/242

See application file for complete search history.

(56) References Cited

U.S. PATENT DOCUMENTS 5,086,537 A  *  2/1992  McDowell .............. A47L 5/365
                                                              15/353
5,369,839 A  *  12/1994 Worwag ................ A47L 7/0028
                                                              15/327.6
(Continued)

FOREIGN PATENT DOCUMENTS

CN        1312048 A     9/2001
CN        1355679 A     6/2002
(Continued)

OTHER PUBLICATIONS

Jan. 12, 2015, Examination Report from the German Patent and Trademark Office in German Design Patent Application No. 102012102180.5, which this U.S. national phase application claims the benefit of priority.

(Continued)

*Primary Examiner* — Dung Van Nguyen
(74) *Attorney, Agent, or Firm* — Kolisch Hartwell, P.C.

(57) ABSTRACT

The present invention relates to a vacuum cleaner, comprising a carrier part, a liquid container, and a suction head. A bracket is pivotably fastened to the liquid container, so that the bracket can be used as a positioning element for the suction head. The suction head can be fixed in a parking position that is tilted by an angle (γ) greater than 0° from the top edge of the container, in that the suction head lies on the bracket. The bracket is latched to the container in the parking position.

20 Claims, 6 Drawing Sheets

(56) References Cited

U.S. PATENT DOCUMENTS

| | | | |
|---|---|---|---|
| 5,611,107 A * | 3/1997 | Tomasiak et al. | 15/327.2 |
| 5,954,863 A | 9/1999 | Loveless et al. | |
| 6,055,700 A | 5/2000 | Holsten et al. | |
| 6,158,083 A * | 12/2000 | Holsten | 15/326 |
| 6,249,933 B1 | 6/2001 | Berfield | |
| 6,375,696 B2 | 4/2002 | Wegelin et al. | |
| 6,508,867 B2 | 1/2003 | Schoenewald et al. | |
| 6,807,706 B2 * | 10/2004 | Fernandez-Grandizo Martinez | 15/327.2 |
| 7,152,274 B2 | 12/2006 | Alford et al. | |
| 8,015,661 B2 * | 9/2011 | Baer et al. | 15/353 |
| 8,074,321 B2 * | 12/2011 | Fry et al. | 15/328 |
| 2005/0108849 A1 | 5/2005 | Lam | |
| 2009/0265882 A1 | 10/2009 | Rhea et al. | |
| 2010/0139032 A1 | 6/2010 | Tomasiak | |
| 2012/0311811 A1 * | 12/2012 | Hollis | A47L 7/0023 15/327.1 |

FOREIGN PATENT DOCUMENTS

| | | |
|---|---|---|
| CN | 1425109 A | 6/2003 |
| CN | 2596927 Y | 1/2004 |
| CN | 1568885 A | 1/2005 |
| CN | 1859864 A | 11/2006 |
| CN | 2862940 Y | 1/2007 |
| CN | 101416850 A | 4/2009 |
| DE | 1801921 A1 | 5/1969 |
| DE | 40600726-0001 | 3/2006 |
| DE | 40600726-0002 | 3/2006 |
| DE | 40600726-0003 | 3/2006 |
| DE | 40600726-0004 | 3/2006 |
| DE | 40600726-0005 | 3/2006 |
| DE | 40600726-0006 | 3/2006 |
| DE | 40600726-0007 | 3/2006 |
| DE | 40600726-0008 | 3/2006 |
| DE | 40600726-0009 | 3/2006 |
| DE | 40600726-0010 | 3/2006 |
| DE | 40600726-0011 | 3/2006 |
| DE | 40600726-0012 | 3/2006 |
| DE | 40600726-0013 | 3/2006 |
| DE | 40600726-0014 | 3/2006 |
| DE | 40600726-0015 | 3/2006 |
| DE | 40600726-0016 | 3/2006 |
| DE | 40600726-0017 | 3/2006 |
| DE | 40600726-0018 | 3/2006 |
| DE | 40600726-0019 | 3/2006 |
| DE | 40600726-0020 | 3/2006 |
| DE | 40600726-0021 | 3/2006 |
| DE | 40600726-0022 | 3/2006 |
| DE | 40600726-0023 | 3/2006 |
| DE | 40600726-0024 | 3/2006 |
| DE | 40600726-0025 | 3/2006 |
| DE | 40600726-0026 | 3/2006 |
| DE | 40600726-0027 | 3/2006 |
| DE | 40600726-0028 | 3/2006 |
| DE | 40600726-0029 | 3/2006 |
| DE | 40600726-0030 | 3/2006 |
| DE | 40600726-0031 | 3/2006 |
| DE | 40600726-0032 | 3/2006 |
| DE | 40600726-0033 | 3/2006 |
| DE | 40600726-0034 | 3/2006 |
| DE | 40600726-0035 | 3/2006 |
| DE | 40600726-0036 | 3/2006 |
| DE | 102005018288 A1 | 10/2006 |
| EP | 1600090 A2 | 11/2005 |
| GB | 1241706 A | 8/1971 |
| JP | H07-39477 A | 2/1995 |
| JP | 2002209812 A | 7/2002 |
| WO | 2005039375 A1 | 5/2005 |

OTHER PUBLICATIONS

Jun. 15, 2013, International Search Report of the International Search Authority from the European Patent Office, in PCT/US2013/053836, which is the international application to this U.S. application.

Jan. 5, 2016, Office action from The State Intellectual Property Office of China in Chinese Patent Application No. 201380014102.2, which is a foreign application that shares the same priority as this U.S. application.

* cited by examiner

ROOM-CLEANING SYSTEM WITH WATER CONTAINER

CROSS-REFERENCE TO RELATED APPLICATIONS

This application is a national phase application of PCT/EP2013/053836, filed Feb. 26, 2013, which claims priority to German Patent Application No. 102012102180.5, filed Mar. 15, 2012, each of which is hereby incorporated by reference.

FIELD OF THE INVENTION

The invention relates to vacuum cleaners, comprising: a liquid container; and a suction head which, in a first position relative to the liquid container, is disposed at the liquid container such that it can be removed.

PRIOR ART

A plurality of vacuum cleaners for cleaning rooms is known. In this connection, a motor generates an air stream, which sucks in dust and other contaminants through a nozzle. The air stream is filtered in the vacuum cleaner, i.e., the dust and dirt particles are extracted from the air stream and collected in a filter for later disposal.

Conventional vacuum cleaners use filters made of paper or synthetic fibre materials. With these systems, however, the suction force fades as the filter becomes clogged. This adversely affects the cleaning power of the vacuum cleaner. In addition, aspirated particles are able to gain entry to the ambient air.

In so-called water vacuum cleaners, a water container is used instead of the paper filter. The water is accommodated in a container into which the aspirated air flows. Usually, the container is removably attached to the vacuum cleaner housing to allow dirty water to be easily replaced. The water absorbs the dust and dirt particles and binds them. The cleaned air flows, usually via a separator, into the suction head, which is connected to the water container and which accommodates the motor, and is then emitted to the environment. Since dust and dirt are completely bound in the water, the emitted air is cleaned as best as possible. Health problems, such as those triggered by dust, dirt and dust mites etc, can thus be prevented.

However, the disadvantage of water vacuum cleaners is that there is always moisture to deal with that accumulates in unwanted places in the components. Drying of these components usually takes a relatively long time.

Technical Object

It is an object of the present invention to provide a vacuum cleaner with a water container that facilitates the handling of wet components.

Technical Solution

This object is achieved by a vacuum cleaner in accordance with claim 1. Advantageous embodiments are the object of the dependent claims.

The inventive vacuum cleaner comprises, a liquid container; and a suction head, which, in a first position relative to the liquid container, is arranged at the liquid container such that it can be removed, wherein the vacuum cleaner has a positioning element which can be adjusted such that the suction head can be arranged in a second position relative to the liquid container, wherein the suction head, in the second position relative to the first position, is inclined at a first angle ($\gamma$) greater than 0°.

The suction head has at least a housing, and a suction motor disposed in the housing. Moreover, a separator may be provided inside the housing. The air aspirated by the suction motor is guided first into the interior of the water container via an inlet channel. There, the air deposits dirt and dust particles, which are bound in the water container. Thereafter, the air (perhaps via a separator) is aspirated into the suction head and emitted from there into the surroundings.

In the first position (working or operating position), the suction head is mounted to the container, e.g. by way of a latch mechanism while, in the second position (parking position), the suction head rests on the container and the positioning element at an inclined angle. The inclined position and/or tilted position relative to the horizontal (and/or opposite the support surface and/or the plane defined by the top edge of the container opening) causes water which has entered the motor head during operation of the "water vacuum cleaner" to run down obliquely towards the bottom and then to flow or drip into the container. Thus, the suction head, when removed, assumes a defined parking or resting position relative to container. In this way, drying of the suction head is accelerated and improved.

This facilitates handling of the suction head, as it does not have to be removed in a wet condition from the container to dry. It is merely placed in an inclined position on the container. The suction head, especially the areas around the separator and the fan of the suction motor, are able to dry better. Accumulation of moisture (with negative consequences such as mildew or odours) can be prevented.

The first angle ($\gamma$) is preferably between 3° and 15°, especially between 3° and 10°. At these angles, an inclination sufficient for drying is achieved, combined with a stable position of the suction head on the top side of the container.

The positioning element is formed especially as a bracket.

Preferably, the positioning element is disposed at the liquid container such that it can pivot. The bracket therefore acts as the handle of the container, in the manner of a bucket handle, and can also serve as a handle in addition to its function as positioning element.

The positioning element has at least a first setting position, which corresponds to the first position of the suction head, and a second setting position, which corresponds to the second position of the suction head. The correspondence of the positions means that, in the first setting position of the positioning element, the suction head is disposed in its first position (operating position) at the container while, in the second setting position of the positioning element, the suction head is disposed in its second position (parking position) and/or rests on the container.

The positioning element can preferably be arrested in the first setting position and/or in the second setting position by an arresting mechanism, especially by a latch mechanism. The mechanism is designed such that the positioning element stays in its position under the weight of the suction head resting on it. Only when additional force is applied from the outside to the positioning element can the arresting/latching mechanism be released, and the positioning element be brought into the first setting position. This unlatching can be effected e.g. by exerting a force on the top side of the suction head.

The positioning element can have a third setting position, in which the positioning element can be used as a handle for transporting the liquid container. Latching or other arresting in this third setting position is also conceivable.

The positioning element especially has an edge which faces the suction head and which, in the first position, is disposed parallel and/or flush with a top edge of the wall bounding an upper opening of the liquid container.

In an embodiment of the invention, the positioning element has an edge which faces the suction head and which, in the second position, is inclined by a second angle ($\beta$) greater than 0° from a top edge of the wall bounding an upper opening of the liquid container.

In the intended operating position of the container, the top edge is generally aligned parallel with the substrate. Inclination of the suction head thus constitutes inclination of the suction head with respect to the top edge and to the substrate.

The second angle ($\beta$) is preferably between 5° and 20°, especially between 6° and 15°. There is a functional relationship between the first angle and the second angle.

The suction head may have ways for allowing the suction head to rest stably on a planar surface. Thus, the suction head can be placed in a stable position on the floor when it is removed from the container. This position can be inclined such that the underside of the housing faces (obliquely) upwards, so that no water can flow out of the interior of the housing. This facilitates "temporary placement" of the suction head, e.g., for the purpose of emptying the water container, without contamination of the environment by dripping (dirty) water.

The suction head can have a carrier part for allowing the liquid container to rest on the carrier part. The carrier part is generally formed as a movable base.

The carrier part preferably has a recess whose cross-section corresponds to the cross-section of the bottom surface of the liquid container. This ensures that the container fits snugly on the carrier part, without the container being able to move laterally relative to the carrier part.

The carrier part can have rollers for supporting the carrier part on the substrate such that it can be moved. The vacuum cleaner in its entirety can thus be moved on the substrate.

The invention relates as a result to a vacuum cleaner with a carrier part, a liquid container, and a suction head. A bracket is mounted to the liquid container such that it can pivot to serve as a positioning element for the suction head. The suction head can be disposed in a parking position that is inclined relative to the top edge of the container at an angle $\gamma$ greater than 0° such that the suction head lies on the bracket. In the parking position, the bracket is latched to the container.

BRIEF DESCRIPTION OF THE DRAWINGS

Further features and advantages of the invention will become apparent from the description of a preferred embodiment according to the drawings.

DESCRIPTION OF A PREFERRED EMBODIMENT

Figure 1:
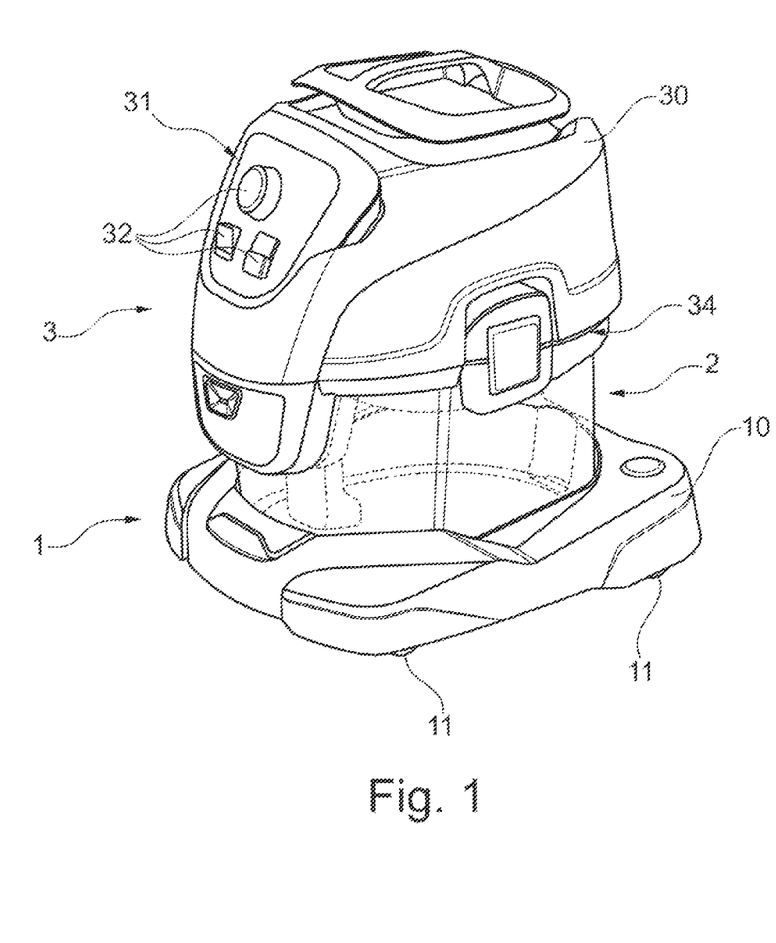
FIG. 1 is a perspective view of an embodiment of a vacuum cleaner according to the present invention.

FIG. 1 shows a perspective view of the preferred embodiment of the inventive vacuum cleaner.

The vacuum cleaner comprises three main components, namely a carrier part 1, a liquid or water container 2 and a suction head 3.

The carrier part 1 has a base 10 and rollers 11 which enable the carrier part 1 to move conveniently over the floor. In the base 10 is formed a recess 12 (cf. FIG. 5), into which the container 2 can be snugly inserted such that the container 2 is secured against lateral movement.

Figure 5:
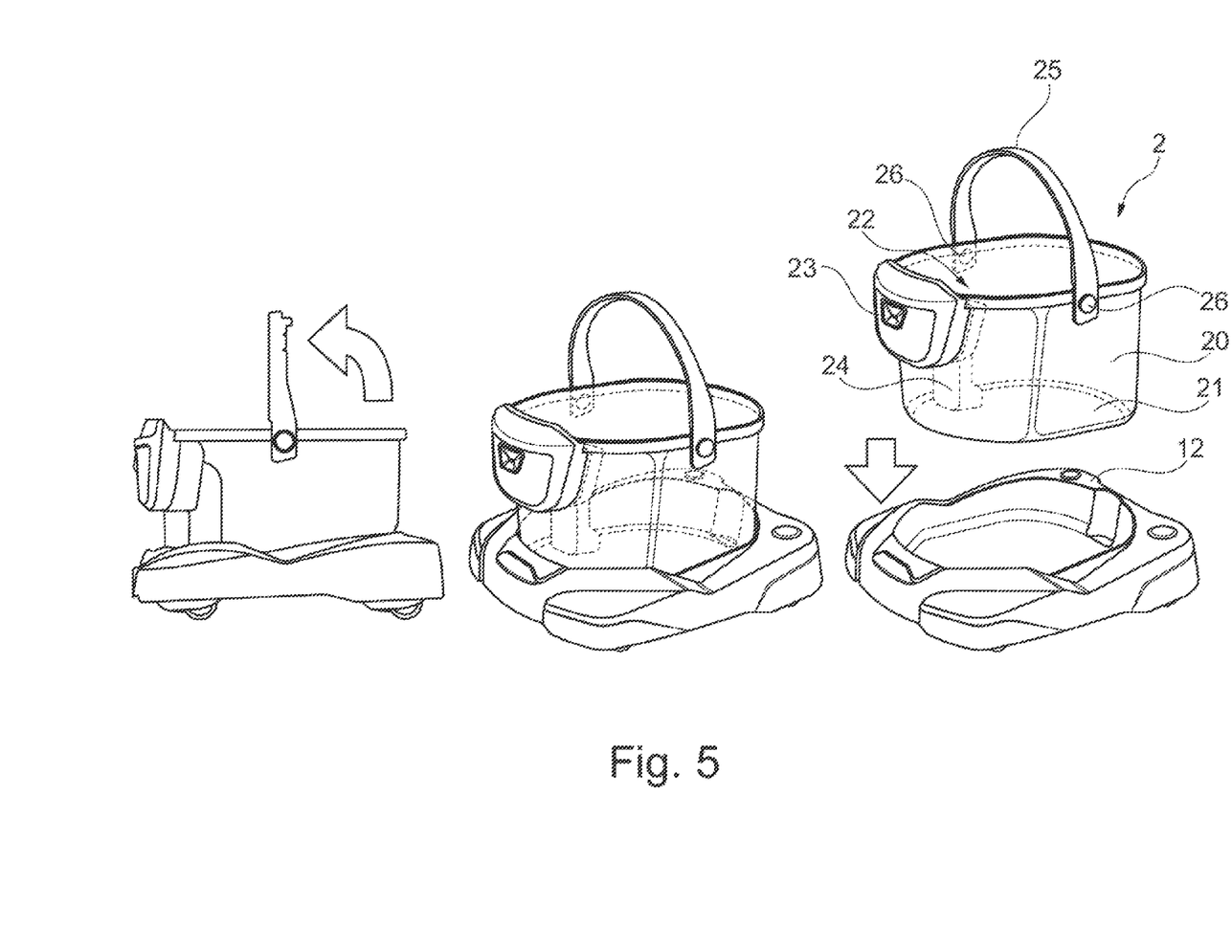
FIG. 5 is a perspective view of components of the embodiment of the vacuum cleaner of FIG. 1.
Figure 6:
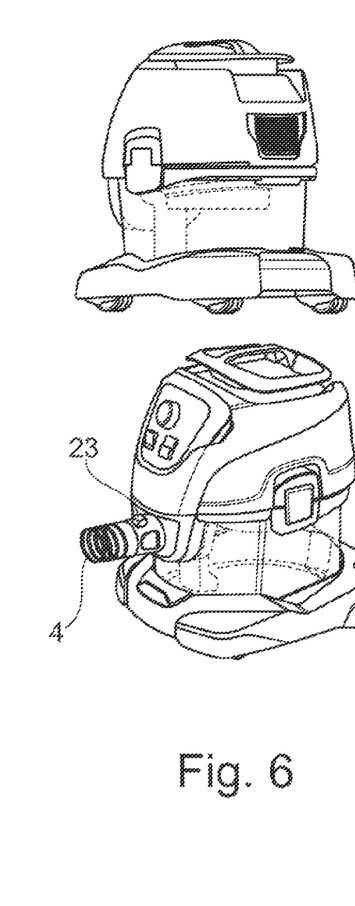
FIG. 6 is a further side view of the embodiment of FIG. 1.

The container 2 has, as shown in FIG. 5, a side wall 20 and a bottom wall 21, which bound an interior space 22. The interior space 22 is at least partially filled with water when the vacuum cleaner is in use. In addition, the container 2 has a connecting element 23 for connecting a hose 4 (cf. FIG. 6). The connecting element has an opening (covered in FIG. 5), which opens into a channel 24 which opens into the interior 22. Air aspirated through the tube 4 thus flows through the opening of the connecting element 23 into the interior 22 of the water container 2 via the channel 24.

In addition, the container 2 has a bracket 25 (cf. FIG. 5), which can be pivoted relative to the container via pivot joints 26 disposed on both sides of the container (the container comprises the walls 20 and 21). As illustrated in FIG. 5, the bracket 25 can be pivoted upwards through approx. 90° from the container top edge to serve as a carrier handle. This allows the container 2 to be simply lifted from the carrier part 1 and transported to a freshwater/wastewater station.

The suction head 3 is mounted snugly and removably to the top side of the water container 2. The suction head 3 has a housing 30 which substantially accommodates a separator and a suction motor. The cleaned air from the suction motor (not shown) is aspirated from the interior 22 of the water container 2 via the separator (not shown) and then emitted into the surroundings.

The suction head 3 further has a control panel 31 with buttons 32 for turning the vacuum cleaner on and off, or, e.g., for setting the suction force of the vacuum cleaner.

However, it is inevitable that, when the vacuum cleaner is in use, the separator will come into contact with water and that moisture will penetrate as far as the region of the suction motor. This is undesirable, since these areas become easily contaminated and odours and mildew can form.

It is also inconvenient to be handling wet components. For example, if the suction head 3 is removed from the container 2 (cf. FIG. 2) and if the suction head 3 is still wet on the inside, then water droplets can drip onto the floor, especially in the vicinity of the vacuum cleaner, and dirty the floor (which may just have been cleaned).

Figure 2:
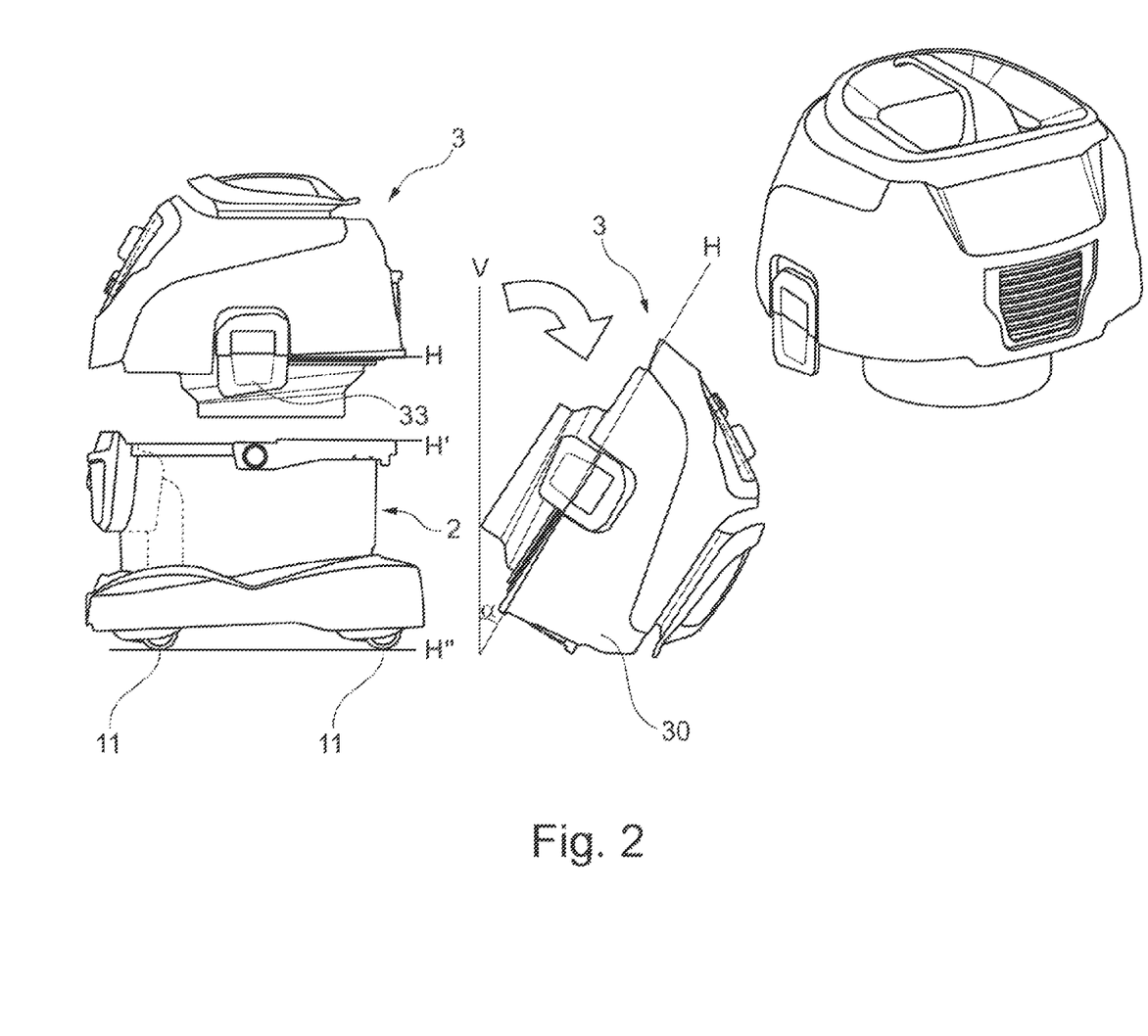
FIG. 2 is a side view of the embodiment of FIG. 1.

After removal, the suction head 3, as shown on the right in FIG. 2, is placed at an angle $\alpha$ of approx. 33° (between the horizontal plane H and vertical plane V). The housing 30 is designed such that the suction head 3 can be placed stably on the floor in this position. The plane H is defined such that the plane is oriented horizontally when the suction head 3 is disposed in the working position (cf. FIG. 1) on the container 2 and the carrier part 1 has been placed on a horizontal plane and/or a horizontal substrate.

The suction head 3 can, moreover, be removably mounted to the container 2 by a closure, e.g. a releasable snap closure 33.

Figure 3A:
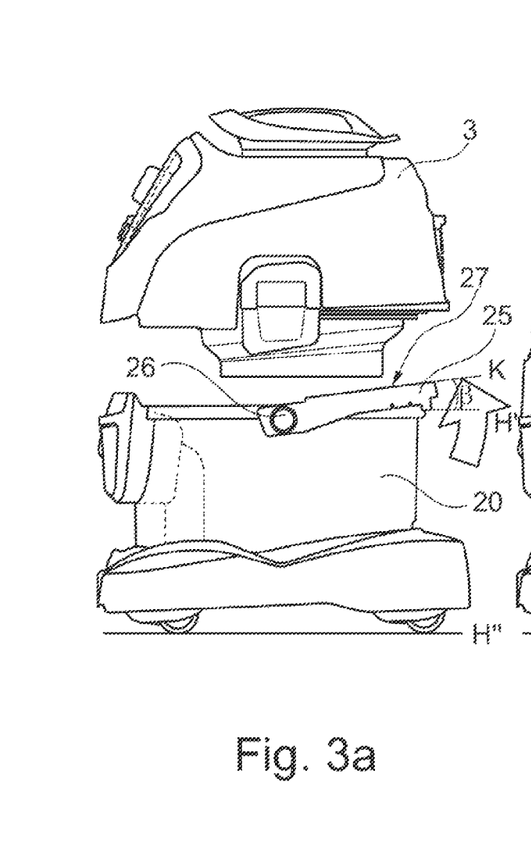
FIGS. 3a-3c show side views of the embodiment of FIG. 1 in different positions.
Figure 3B:
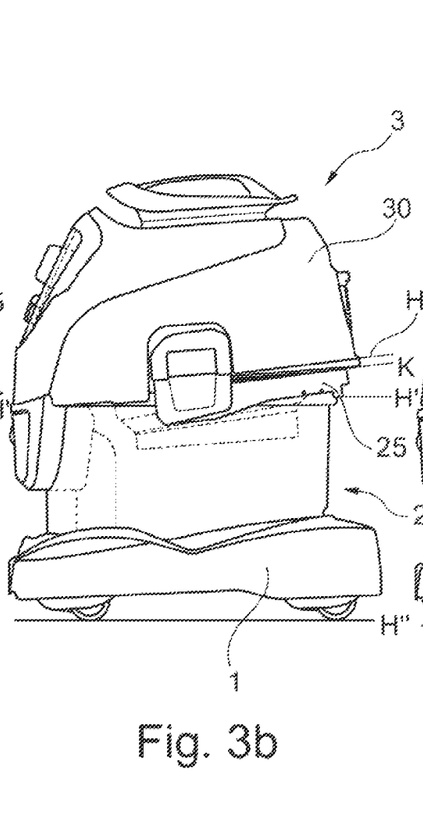
Figure 3C:
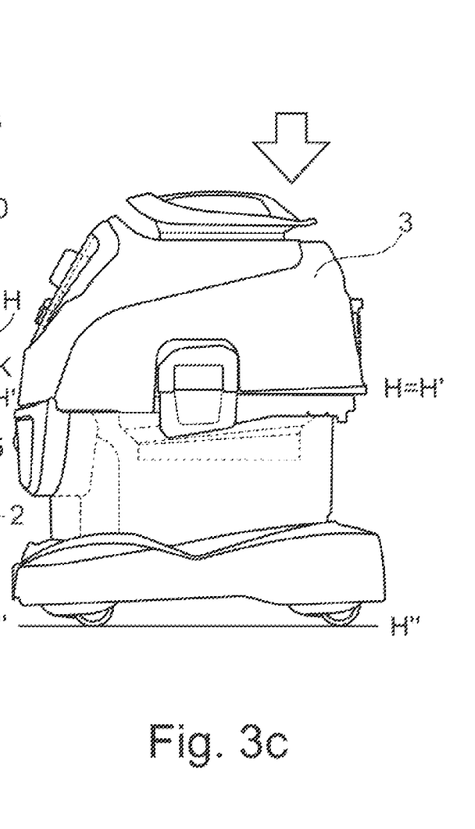

FIGS. 3a-3c show the vacuum cleaner in different states. These reveal a further function of the invention of the bracket 25, namely its function as a positioning element for the suction head 3.

FIG. 3c shows the suction head 3 in a working or operating position. The suction head 3 is mounted to the container 2 such that the plane H is aligned horizontally (or parallel with the bearing plane H"). The bracket 25, too, in this state is aligned in and/or parallel with the plane H. The plane H is also aligned parallel with the plane H', which is determined by the top edge of the container 20, 21 (cf. FIG. 3a).

FIG. 3a shows the suction head 3 after it has been released and lifted off the container 2. The bracket 25, which was aligned parallel in the working position of the suction head 3 (cf. FIG. 1), has now pivoted upwards through an angle β of about 10° relative to the plane H'. That edge 27 of the bracket 25 facing away from the container 20, 21 spans a plane K, which forms the angle β with the plane H'.

The bracket can be arrested stably in the position of FIG. 3a, e.g., by a latch mechanism 28 (cf. also FIG. 4b), which has a latching lip 28' (cf. FIG. 5), which rests on the upper rim of the container. The latch mechanism comprises a projection and/or a recess, which is formed at the bracket 25 and faces the container wall 20. The projection and/or the recess cooperates with a corresponding projection and/or a corresponding recess, which is formed in the upper area of the container wall 20. The projections/recesses cooperate such that the latch can be released and the bracket pivoted into the default position only when a minimum force is applied to the top edge 27 of the bracket 25. The application of this minimum force/minimum torque pushes the latching lip over the rim of the container to latch in the working position (in which the edge 27 of the bracket 25 lies horizontally in the plane H'). The latching lip then latches beneath a fold of the container rim.

In this embodiment, the bracket 25 is kept in the parking position.

In this way, the bracket 25 is releasably secured in a parking position in which moisture can drain rapidly and completely from the suction head 3 into the container 2.

In the parking position according to FIG. 3b, the suction head 3 can be placed on the bracket 25 (and/or the edge 27 of the bracket 25) and the bracket 25 can support the suction head 3. The plane H of the suction head 3 is then no longer aligned horizontally and/or parallel with the plane H' and with the substrate H", but is inclined at an angle γ of about 6°, relative to H' and H". The head 3 has thus been placed at an oblique angle. Water located inside the housing 30 runs downward due to the incline and into the interior 22 of the container 2.

The position shown in FIG. 3b is termed the parking position, as the vacuum cleaner is not ready for use in this arrangement of the components. The position shown in FIG. 3c is termed the working or operating position, as the vacuum cleaner can be put into and/or be in operation in this arrangement of the components.

In another embodiment of the invention, the bracket 25 can be held in a position by friction in the joints and/or bearings 26.

Figure 4A:
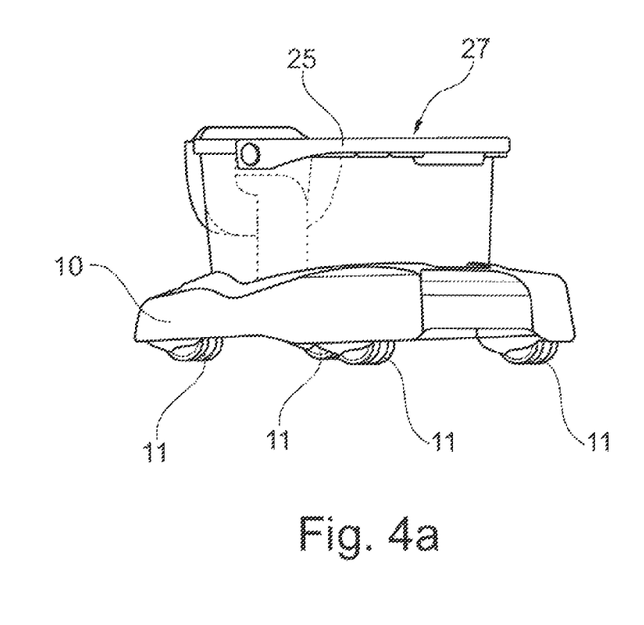
FIGS. 4a, 4b show views of components of the vacuum cleaner of the embodiment of FIG. 1.
Figure 4B:
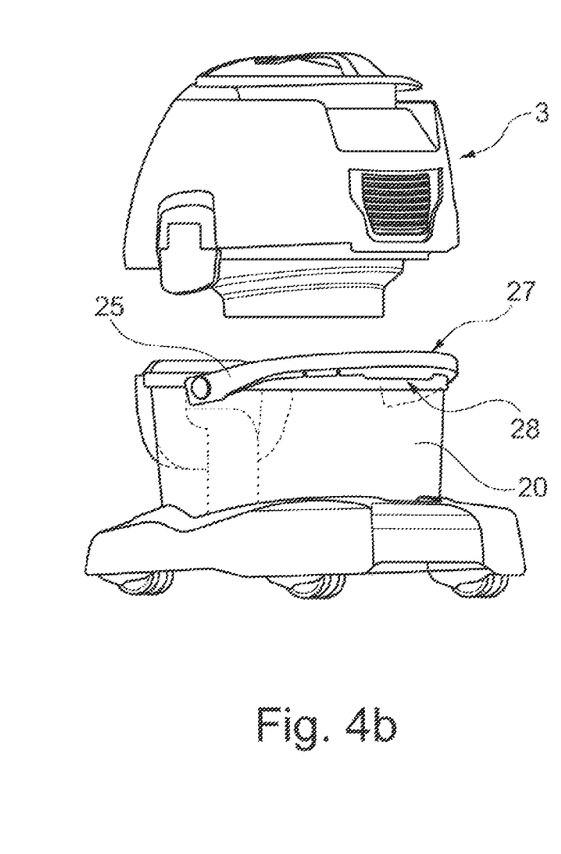

FIGS. 4a and 4b show the two positions of the bracket 25, namely, in FIG. 4a, the default position with a horizontal plane which is spanned by the edge 27 and which is parallel with and flush with the top edge of the container 20, 21 and, in FIG. 4b, the parking position with a plane which is spanned by the edge 27 and which is inclined to the horizontal H" and to the top edge H' of the container 20, 21 and which is not flush with the top edge. H' and K form an angle β, while H' and H form an angle γ.

Figure 7:
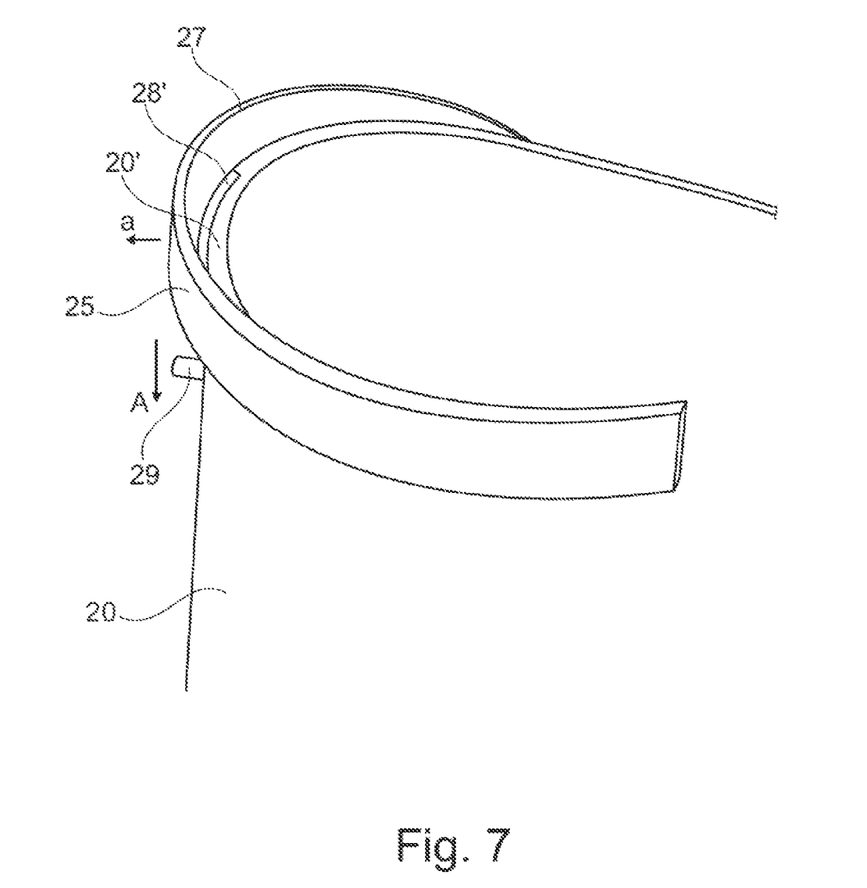
FIG. 7 is a detailed view of the embodiment of FIG. 1.

The position of the bracket 25 in the parking position is shown schematically in FIG. 7. The latching lip 28' rests on the container rim 20', thus keeping the bracket 25 in position with respect to the action of a force/torque symbolized by the arrow A (A is directed towards the container bottom). Thus, the top edge 27 of the bracket 25 extends beyond the plane determined by the container rim 20'. Only when a certain value A is exceeded does the latching lip 28' (e.g. by way of a chamfer of the contact surface relative to the horizontal) slide outwards (arrow a) and the bracket 25 can be pushed down into the working position. A stop 29 may be provided which limits the downward travel of the bracket.

An embodiment of the present invention relates to a vacuum cleaner, comprising a carrier part (1), a liquid container (2), and a suction head (3). A bracket (25) is pivotably fastened to the liquid container (2), so that the bracket can be used as a positioning element for the suction head (3). The suction head (3) can be fixed in a parking position that is tilted by an angle (γ) greater than 0° from the top edge of the container (2), in that the suction head (3) lies on the bracket (25). The bracket (25) is latched to the container in the parking position.

The present disclosure may include one or more of the following concepts:

A. Vacuum cleaner, comprising: a liquid container (2); and a suction head (3), which is arranged in a first position, relative to the liquid container (2), such that it can be removed from the liquid container (2), characterised by the fact that the vacuum cleaner has a positioning element (25), which can be adjusted such that the suction head (3) can be arranged in a second position relative to the liquid container (2), wherein the suction head (3), in the second position relative to the first position, is inclined at a first angle (γ) angle greater than 0°.

B. Vacuum cleaner in accordance with paragraph A, characterised by the fact that the first angle (γ) lies between 3° and 15°.

C. Vacuum cleaner in accordance with paragraph A or B, characterised by the fact that the positioning element (25) is configured as a bracket.

D. Vacuum cleaner in accordance with any of the previous paragraphs, characterised by the fact that the positioning element (25) is pivotably arranged at the liquid container (2).

E. Vacuum cleaner in accordance with any of the previous paragraphs, characterised by the fact that the positioning element (25) has at least a first setting position, which corresponds to the first position of the suction head (3), and a second setting position, which corresponds to the second position of the suction head (3).

F. Vacuum cleaner in accordance with any of the previous paragraphs, characterised by the fact that the positioning element (25) can be arrested in the first setting position and/or in the second setting position by an arresting mechanism, especially a latching mechanism.

G. Vacuum cleaner in accordance with any of the previous paragraphs, characterised by the fact that the positioning element (25) has a third setting position in which the positioning element (25) can serve as a handle for transporting the liquid container (2).

H. Vacuum cleaner in accordance with any of the previous paragraphs, characterised by the fact that the positioning element (25) has an edge which faces the suction head (3) and which, in the first position, is arranged parallel and/or flush with a top edge of the wall (20) bounding an upper opening of the liquid container (2).

I. Vacuum cleaner in accordance with any of the previous paragraphs, characterised by the fact that the positioning element (25) has an edge which faces the suction head (3) and which, in the second position, is inclined at a second angle (β) greater than 0° relative to a top edge of the wall (20) bounding an upper opening of the liquid container (2).

J. Vacuum cleaner in accordance with paragraph I, characterised by the fact that the second angle (3) lies between 5° and 20°.

K. Vacuum cleaner in accordance with any of the previous paragraphs, characterised by the fact that the suction head (3) has ways for allowing the suction head (3) to rest stably on a planar surface.

L. Vacuum cleaner in accordance with any of the previous paragraphs, characterised by the fact that the vacuum cleaner has a carrier part (1) for allowing the liquid container (2) to lie on the carrier part (1).

M. Vacuum cleaner in accordance with paragraph L, characterised by the fact that the carrier part (1) has a recess, whose cross-section corresponds to the cross-section of the bottom surface of the liquid container (2).

N. Vacuum cleaner in accordance with paragraphs L or M, characterised by the fact that the carrier part (1) has rollers (11) for allowing the carrier part (1) to lie movably on the substrate.

What is claimed is:

1. A vacuum cleaner, comprising:
   a liquid container having an interior space which is adapted for being filled at least partially with liquid; and
   a suction head, which is arranged in a first position, relative to the liquid container, such that the suction head can be removed from the liquid container,
   wherein the vacuum cleaner has a positioning element, which can be adjusted such that the suction head can be arranged in a second position relative to the liquid container, wherein the suction head, in the second position relative to the first position, is inclined at a first angle (γ) angle wherein the first angle (γ) lies between about 3° and about 15°, and wherein the liquid container has a connecting element and a channel having a channel end arranged in the liquid of the interior space, and air flows through an opening in the connecting element and into the interior space of the liquid container via the channel and is guided in the liquid in order to bind dirt and dust.

2. The vacuum cleaner in accordance with claim 1, wherein the positioning element is configured as a bracket.

3. The vacuum cleaner in accordance with claim 2, wherein the positioning element is pivotably arranged at the liquid container.

4. The vacuum cleaner in accordance with claim 3, wherein the positioning element has at least a first setting position, which corresponds to the first position of the suction head, and a second setting position, which corresponds to the second position of the suction head.

5. The vacuum cleaner in accordance with claim 4, wherein the positioning element can be arrested in the first setting position and/or in the second setting position by an arresting mechanism.

6. The vacuum cleaner in accordance with claim 5, wherein the positioning element has a third setting position in which the positioning element can serve as a handle for transporting the liquid container.

7. The vacuum cleaner in accordance with claim 6, wherein the positioning element has an edge which faces the suction head and which, in the first position, is arranged parallel and/or flush with a top edge of a wall bounding an upper opening of the liquid container.

8. The vacuum cleaner in accordance with claim 7, wherein the edge which faces the suction head, in the second position, is inclined at a second angle (β) greater than 0° relative to the top edge of the wall bounding the upper opening of the liquid container.

9. The vacuum cleaner in accordance with claim 8, wherein the second angle (β) lies between about 5° and about 20°.

10. The vacuum cleaner in accordance with claim 1, wherein the suction head is adapted to allow the suction head to rest stably on a planar surface.

11. The vacuum cleaner in accordance with claim 1, wherein the vacuum cleaner has a carrier part for allowing the liquid container to lie on the carrier part.

12. The vacuum cleaner in accordance with claim 11, wherein the carrier part has a recess, whose cross-section corresponds to a cross-section of a bottom surface of the liquid container.

13. The vacuum cleaner in accordance with claim 12, wherein the carrier part has rollers adapted for allowing the carrier part to lie movably on a substrate.

14. The vacuum cleaner in accordance with claim 11, wherein the carrier part has rollers adapted for allowing the carrier part to lie movably on a substrate.

15. The vacuum cleaner in accordance with claim 1, wherein the positioning element is configured as a bracket.

16. The vacuum cleaner in accordance with claim 1, wherein the positioning element is pivotably arranged at the liquid container.

17. The vacuum cleaner in accordance with claim 1, wherein the positioning element has at least a first setting position, which corresponds to the first position of the suction head, and a second setting position, which corresponds to the second position of the suction head.

18. The vacuum cleaner in accordance with claim 17, wherein the positioning element has a third setting position in which the positioning element is adapted as a handle for transporting the liquid container.

19. The vacuum cleaner in accordance with claim 1, wherein the liquid container includes a side wall and a bottom wall that bound the interior space, the bottom wall being disposed in a bottom half of the liquid container, further wherein the channel end extends in the interior space into the bottom half of the liquid container.

20. A vacuum cleaner, comprising:
    a liquid container having an interior space which is adapted for being filled at least partially with liquid; and
    a suction head, which is arranged in a first position, relative to the liquid container, such that the suction head can be removed from the liquid container,
    wherein the vacuum cleaner has a positioning element, which can be adjusted such that the suction head can be arranged in a second position relative to the liquid container, wherein the suction head, in the second position relative to the first position, is inclined at a first angle (γ) angle greater than 0°, wherein the positioning element stays in its position under the weight of the suction head resting on it when the suction head is in the second position relative to the liquid container, and wherein the liquid container has a connecting element and a channel having a channel end arranged in the liquid of the interior space, and air flows through an opening in the connecting element and into the interior space of the liquid container via the channel and is guided in the liquid in order to bind dirt and dust.

* * * * *